United States Patent
Bade et al.

(10) Patent No.: US 9,058,277 B2
(45) Date of Patent: Jun. 16, 2015

(54) DYNAMIC EVALUATION AND RECONFIGURATION OF A DATA PREFETCHER

(71) Applicant: ADVANCED MICRO DEVICES, INC., Sunnyvale, CA (US)

(72) Inventors: Sharad Dilip Bade, Acton, MA (US); Alok Garg, Bangalore (IN); John Kalamatianos, Arlington, MA (US); Paul Keltcher, Lexington, MA (US); Marius Evers, Sunnyvale, CA (US); Chitresh Narasimhaiah, San Jose, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 203 days.

(21) Appl. No.: 13/671,801

(22) Filed: Nov. 8, 2012

(65) Prior Publication Data

US 2014/0129780 A1    May 8, 2014

(51) Int. Cl.
*G06F 12/08* (2006.01)
*G06F 9/38* (2006.01)

(52) U.S. Cl.
CPC .......... *G06F 12/0862* (2013.01); *G06F 9/3842* (2013.01); *G06F 2212/6024* (2013.01); *G06F 2212/6026* (2013.01); *Y02B 60/1225* (2013.01)

(58) Field of Classification Search
CPC .................................................. G06F 12/0862
USPC ......................................................... 711/137
See application file for complete search history.

(56) References Cited

U.S. PATENT DOCUMENTS

| | | | |
|---|---|---|---|
| 2013/0238861 A1* | 9/2013 | Manne et al. ................. | 711/137 |
| 2013/0246708 A1* | 9/2013 | Ono et al. ..................... | 711/122 |
| 2013/0332705 A1* | 12/2013 | Martinez et al. ............. | 712/220 |

\* cited by examiner

*Primary Examiner* — Alford Kindred
*Assistant Examiner* — Zubair Ahmed
(74) *Attorney, Agent, or Firm* — Park, Vaughan, Fleming & Dowler, LLP (57) ABSTRACT

Methods and systems for prefetching data for a processor are provided. A system is configured for and a method includes selecting one of a first prefetching control logic and a second prefetching control logic of the processor as a candidate feature, capturing the performance metric of the processor over an inactive sample period when the candidate feature is inactive, capturing a performance metric of the processor over an active sample period when the candidate feature is active, comparing the performance metric of the processor for the active and inactive sample periods, and setting a status of the candidate feature as enabled when the performance metric in the active period indicates improvement over the performance metric in the inactive period, and as disabled when the performance metric in the inactive period indicates improvement over the performance metric in the active period.

18 Claims, 7 Drawing Sheets

DYNAMIC EVALUATION AND RECONFIGURATION OF A DATA PREFETCHER

TECHNICAL FIELD

The technical field relates generally to data prefetching techniques, and more particularly to dynamic evaluation and reconfiguration of hardware data prefetching features for cache memories.

BACKGROUND

Computer systems typically include a processing unit and one or more cache memories. A cache memory is a high-speed memory that acts as a buffer between the processor and main memory. Although smaller than the main memory, the cache memory typically has appreciably faster access time than the main memory. Memory subsystem performance can be increased by storing the most commonly used information in smaller but faster cache memories.

When the processor accesses a memory address, the cache memory determines if the data associated with the memory address is stored in the cache memory. If the data is stored in the cache memory, a cache hit results and the data is provided to the processor from the cache memory. If the data is not in the cache memory, a cache miss results and a lower level in the memory hierarchy must be accessed. Due to the additional access time for lower level memory, data cache misses can account for a significant portion of an application program's execution time.

In order to reduce cache miss rates, various hardware prefetching techniques have been developed. Prefetching involves fetching data or instructions from lower levels in the memory hierarchy and into the cache memory before the processor would ordinarily request the data be fetched. By anticipating processor access patterns, prefetching helps reduce average memory service time. The effectiveness of prefetching is limited by the ability of a particular prefetching method to predict addresses from which the processor will need to access data. Hardware prefetching methods typically attempt to take advantage of patterns in memory accesses by observing all, or a particular subset of, memory transactions and prefetching as yet unaccessed data for anticipated memory accesses. Memory transactions observed can include read and/or write accesses or cache miss transactions.

Various methods of hardware prefetching are typically beneficial for some applications or workloads and may be detrimental for other applications. One type of prefetching is known as next line data prefetching. Client applications and the SpecCpu benchmark applications may benefit from next line prefetching due to typically sequential memory access patterns, but database and server applications often do not benefit from next line data prefetching due to typically non-sequential memory access patterns. Another type of prefetching involves training a prefetch table (PT) based on the L1 cache miss data. However, training a data prefetcher with the previous cache miss address stream does not always generate accurate prefetch requests for the next level cache. For example, when the L1 cache miss data overflows the PT table it may be difficult to detect patterns and accurately predict what data to bring into the cache.

The various hardware prefetchers are typically statically configured in an operating system when the system boots. Therefore, the hardware prefetcher is unresponsive to changing operating conditions and may suffer decreased performance at various times between system boots under some applications or workloads.

SUMMARY OF EMBODIMENTS

In some embodiments, a method of prefetching data for a processor includes selecting one of a first prefetching control logic and a second prefetching control logic of the processor as a candidate feature for evaluation, capturing a performance metric of the processor over an inactive sample period when the candidate feature is inactive, capturing the performance metric of the processor over an active sample period when the candidate feature is active, comparing the performance metric of the processor for the active and inactive sample periods, and setting a status, by the processor, of the candidate feature as enabled when the performance metric in the active period indicates improvement over the performance metric in the inactive period, and as disabled when the performance metric in the inactive period indicates improvement over the performance metric in the active period.

In some embodiments, an electronic device includes a processor core, an interconnect in electronic communication with the processor execution core, first and second cache memories, and a hardware implemented prefetch controller. The cache memories and the prefetch controller are coupled to the interconnect. The prefetch controller is configured to evaluate a first prefetching control logic and a second prefetching control logic for prefetching data from a system memory to at least one of the first and second cache memories. The prefetch controller includes a default control logic, the first prefetching control logic, the second prefetching control logic, and a dynamic prefetcher selection logic (DPSL). The default control logic is configured for prefetching data with the first and second prefetching control logics inactive. The DPSL is configured for selecting one of the first prefetching control logic and the second prefetching control logic as a candidate feature, capturing a performance metric of the computing system over an inactive sample period when the candidate feature is inactive, capturing the performance metric of the computing system over an active sample period when the candidate feature is active, comparing the performance metric of the processor for the active and inactive sample periods, and setting a status of the candidate feature as active when the performance metric in the active period indicates improvement over the performance metric in the inactive period, and as inactive when the performance metric in the inactive period indicates improvement over the performance metric in the active period.

In some embodiments a computing system includes a system memory, an interconnect coupled to the system memory, and a processor in electronic communication with the system memory via the interconnect. The processor includes a first cache memory coupled to the interconnect, a second cache memory coupled to the interconnect, a prefetch table control logic, first and second prefetch control logics, and a dynamic prefetcher selection logic. The prefetch table control logic is coupled to the interconnect for prefetching data for the second cache memory and is configured to train on miss traffic from the first cache memory. The first prefetch control logic is configured to train the prefetch table control logic on miss traffic from the second cache memory. The second prefetch control logic is configured to enable next line data prefetching to prefetch data for the at least one of the first and second cache memories. The dynamic prefetcher selection logic is configured to select one of either the first prefetch control logic or the second prefetch control logic as a candidate feature, capture a performance metric of the processor over an active sample period when the selected candidate feature is active, capture the performance metric of the processor over an inactive sample period when the selected candidate feature is inactive, compare the performance metric of the processor for the active and inactive sample periods, and set a status of the selected candidate feature as active when the performance metric in the active period indicates improvement over the performance metric in the inactive period, and as inactive when the performance metric in the inactive period indicates improvement over the performance metric in the active period.

BRIEF DESCRIPTION OF THE DRAWINGS

Advantages of the embodiments disclosed herein will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiments described herein as "exemplary" are not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below as being "connected," these elements may be "coupled," and vice versa. Thus, although the block diagrams shown herein depict example arrangements of elements, additional intervening elements, devices, features, or components may be present in actual embodiments.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in the embodiments disclosed herein.

In some embodiments, an improved system and method for prefetching data for a cache memory is provided. Other desirable features and characteristics of the embodiments will become apparent from the subsequent detailed description of the embodiments and the appended claims, taken in conjunction with the accompanying drawings.

Figure 1:
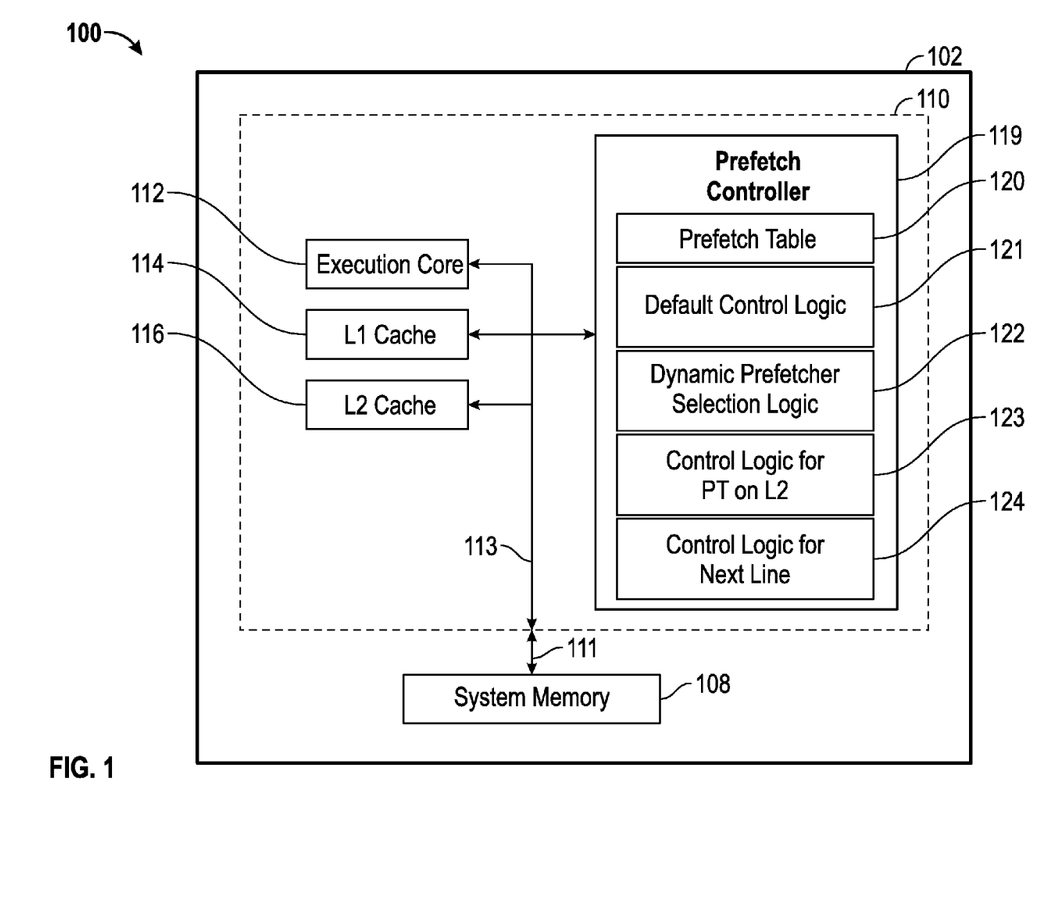
FIG. 1 is a simplified block diagram of a computing system according to some embodiments.

Referring now to FIG. 1, a simplified block diagram is shown illustrating a computer system 100 according to some embodiments. The computer system 100 includes a case or housing 102, system memory 108, a processor 110, and an interconnect 111 in electronic communication with the system memory 108 and the processor 110. The computer system 100 may be a desktop computer, laptop computer, server, set top box, digital television, printer, camera, motherboard, or any other device that includes the processor 110. Additional components such as displays and user input components may be employed without departing from the scope of the present disclosure. The system memory 108 in the example illustrated is a dynamic random-access memory ("DRAM") that communicates with the processor 110, although other memory technologies could be used.

The processor 110 includes at least one execution core 112, an interconnect 113, an L1 (level 1) cache memory 114, an L2 (level 2) cache memory 116, and a prefetch controller 119. The interconnect 113 is in electronic communication with the interconnect 111, the execution core 112, the cache L1 cache memory 114, the L2 cache memory 116, and the prefetch controller 119. It should be appreciated that the processor 110 may include additional features and may have configurations and memory hierarchies other than shown in FIG. 1. The execution core 112 uses data and instructions from the L1 cache memory 114, the L2 cache memory 116, and the system memory 108. The L1 cache memory 114 is the highest level memory in the memory hierarchy and is typically the first accessed by the execution core 112. When the data requested is not found in the L1 cache memory 114, the L2 cache memory 116 is checked for the data. If the data is not found in the L2 cache memory 116, the system memory 108 is checked for the data.

The prefetch controller 119 includes control logic that predicts what data will be requested by the execution core 112 and brings the predicted data into the smaller and faster cache memories. The control logic is hardware implemented in a semiconductor such as silicon. In the example provided, the prefetch controller 119 includes a prefetch table (PT) 120 and a control logic 121 that uses the PT 120 to issue prefetches for the L2 cache memory 116. The control logic 121 operates as the default prefetch control logic for the prefetch controller 119, as will be explained below in connection with FIG. 2. The control logic 121 issues L2 prefetch requests by training the PT 120 on L1 data cache miss addresses.

The prefetch controller 119 illustrated has dynamic prefetcher selection logic (DPSL) 122 that selects between a control logic 123 for training the PT 120 on L2 miss traffic and a control logic 124 for next line prefetching. The control logics 123 and 124 are disabled by default and may be enabled by the DPSL 122 to complement or replace a portion of the control logic 121, as will be explained below in connection with FIG. 2. The DPSL 122 is configured to evaluate the control logics 123 and 124 for enablement when the control logics 123 and 124 are likely to benefit performance. The prefetch controller 119 selects one of control logic 123 and 124 as a candidate feature each time a sample group threshold is exceeded. The candidate feature is a feature that is selected for evaluation by the DPSL 122 over a period of time as defined by the sample group. For example, the control logic 123 or the control logic 124 may be selected as the candidate feature. The prefetch controller 119 evaluates the candidate feature and enables the candidate feature for the remaining samples of the sample group when the candidate feature improves performance.

The control logic 123 trains the PT 120 on L2 misses, which typically has fewer misses training the PT 120 than the default control logic 121 that trains the PT 120 on the L1 miss stream. The control logic 123 disables the default control logic 121 so that the default control logic 121 is not training the PT 120 on the L1 miss stream. Under some applications the lower L2 miss traffic improves the ability of the prefetch controller 119 to identify patterns in the traffic, such as when the L1 miss traffic overflows the tables with heavy miss traffic. The control logic 124 enables a next line hardware prefetcher. The control logic 124 runs in parallel with and does not disable the default control logic 121. When a processor requests an address, a normalized cache line is brought into the core. The control logic 124 for next line prefetching transfers the next cache line into the cache in expectation of upcoming use by the execution core 112.

Figure 2:
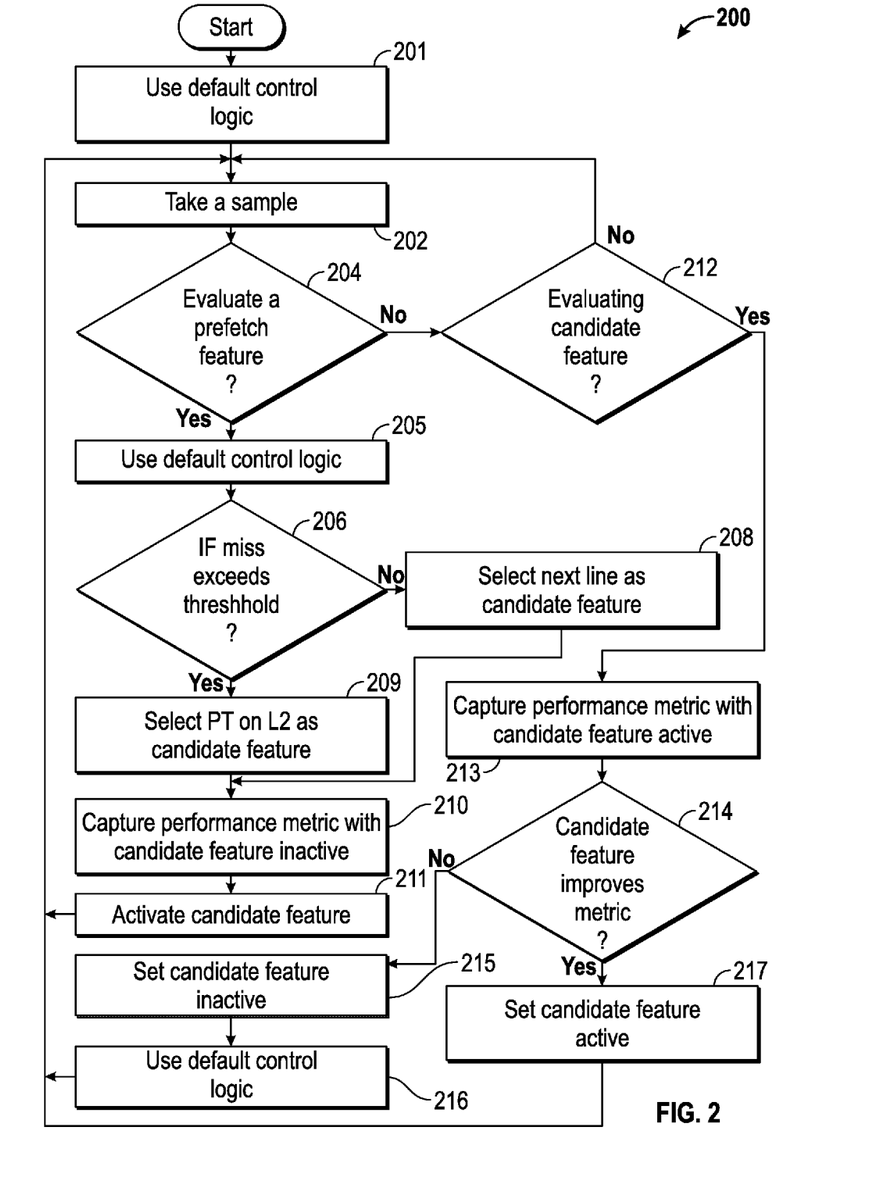
FIG. 2 is a flow diagram illustrating a method of prefetching data for a processor according to some embodiments.
Figure 3A:
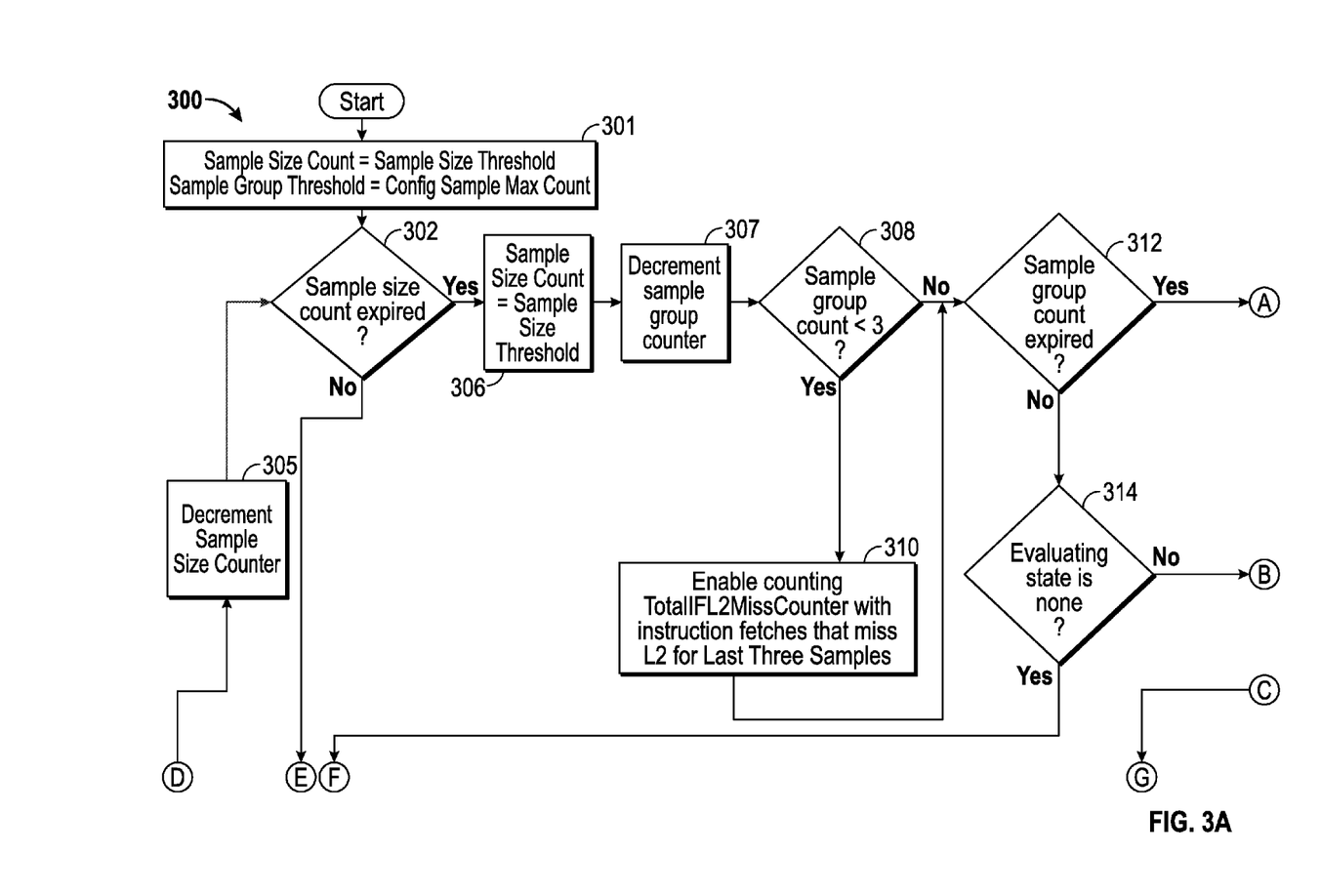
FIGS. 3A-E are views of a flow diagram illustrating a method of prefetching data for a processor according to some embodiments.
Figure 3B:
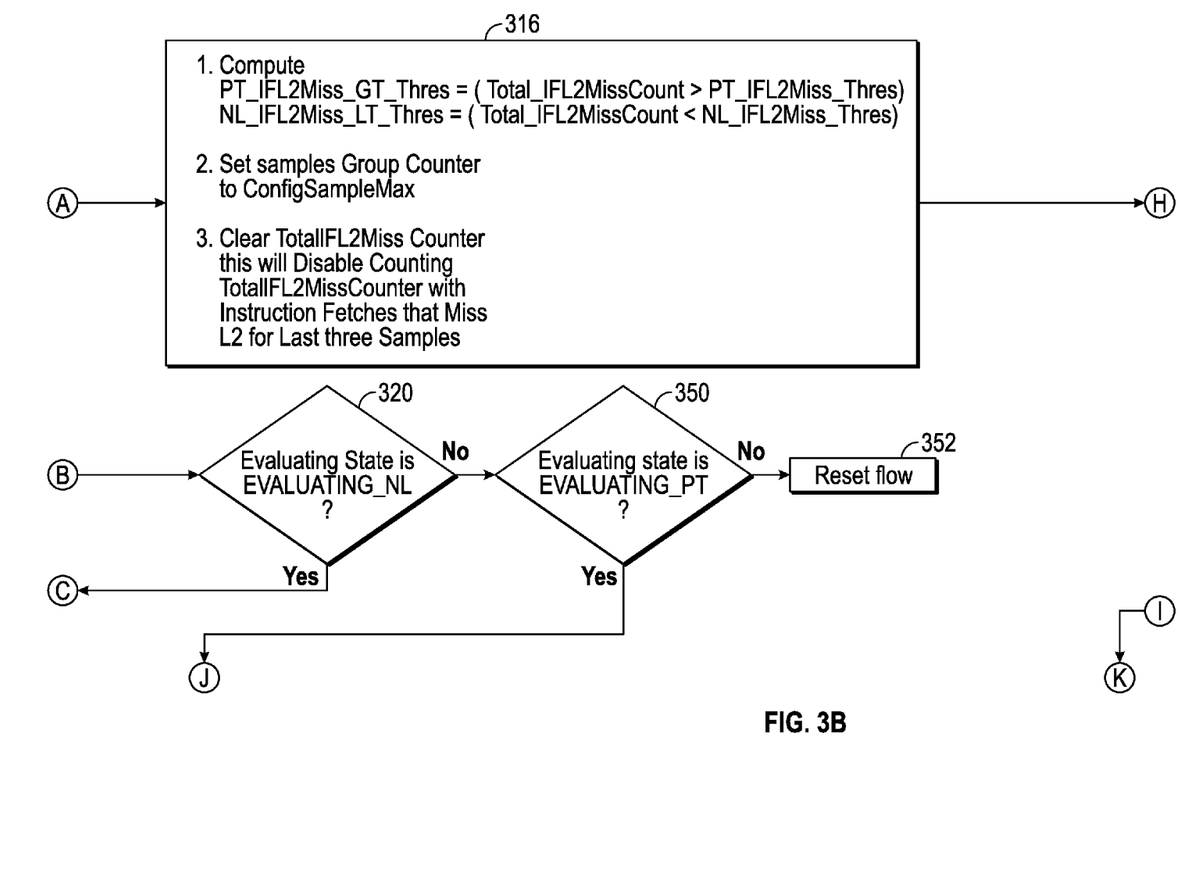
Figure 3C:
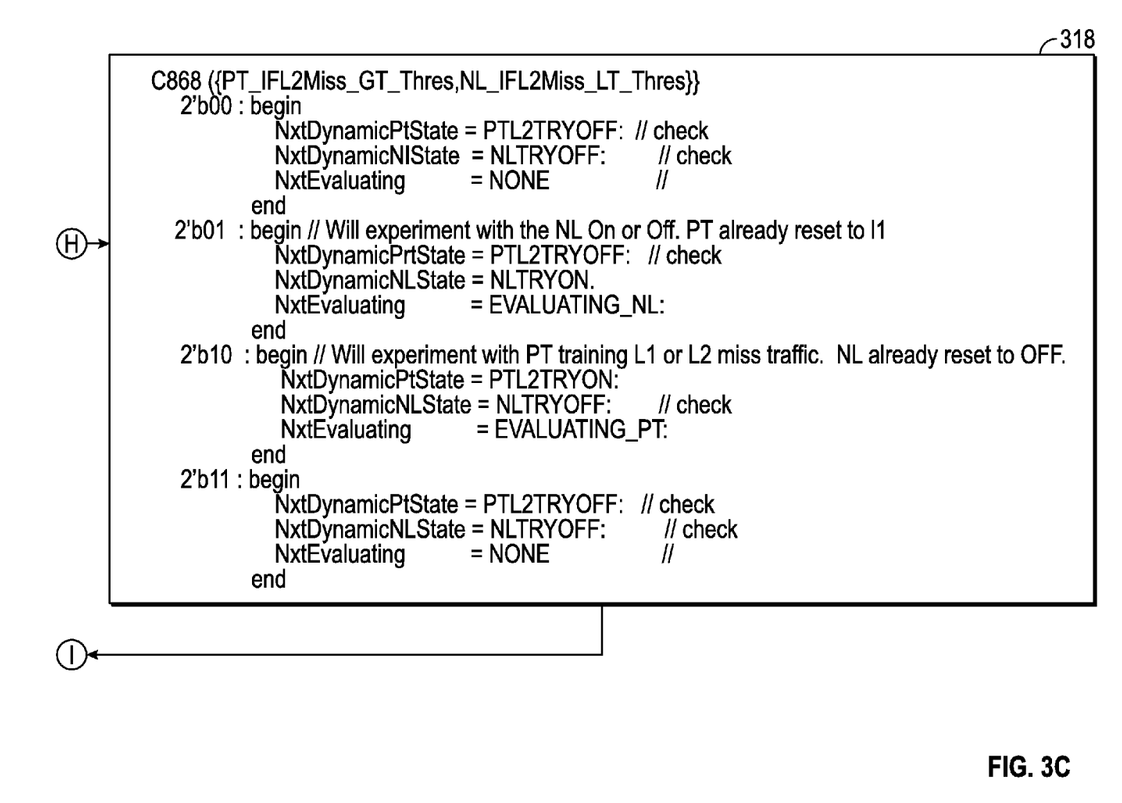
Figure 3D:
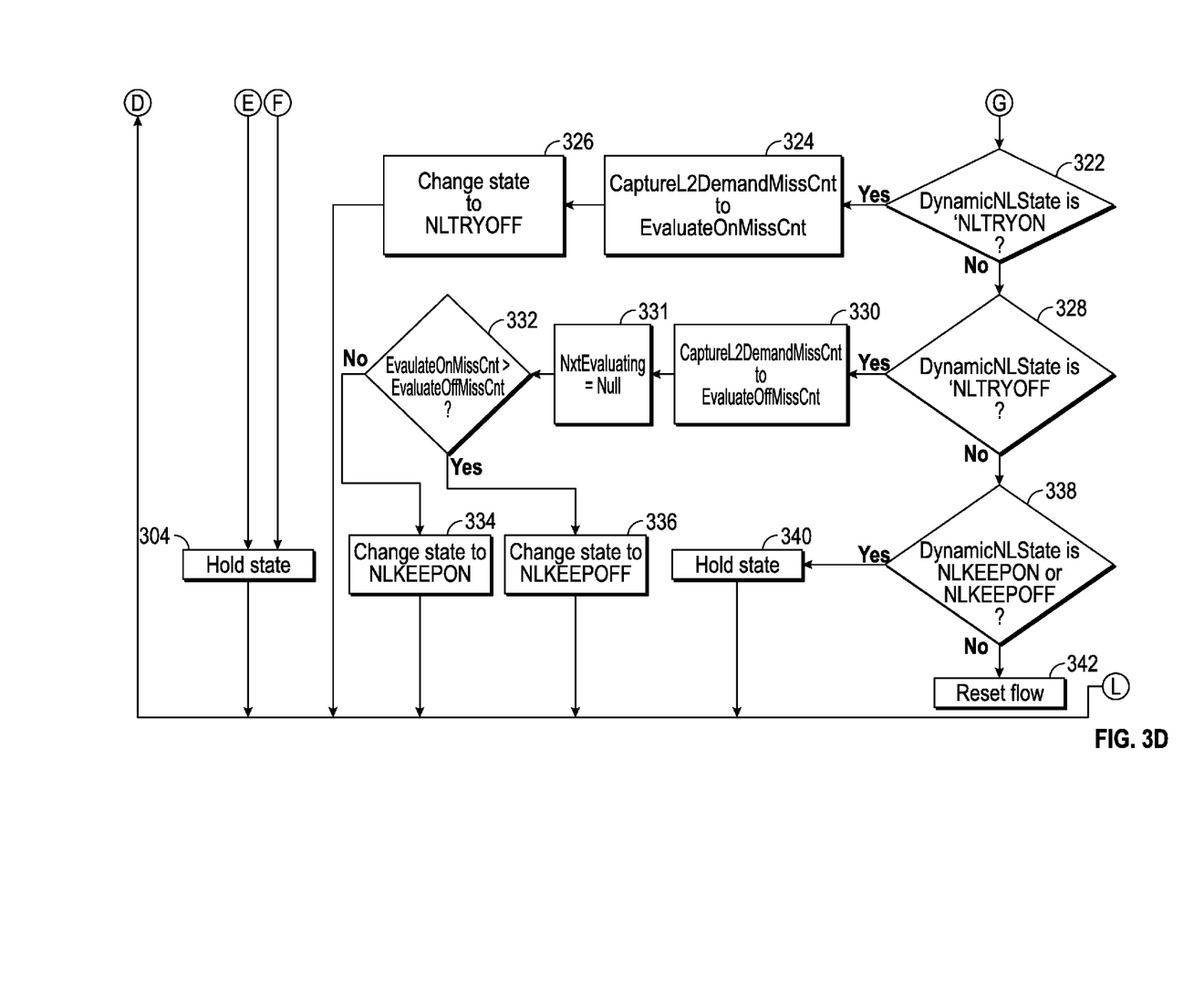
Figure 3E:
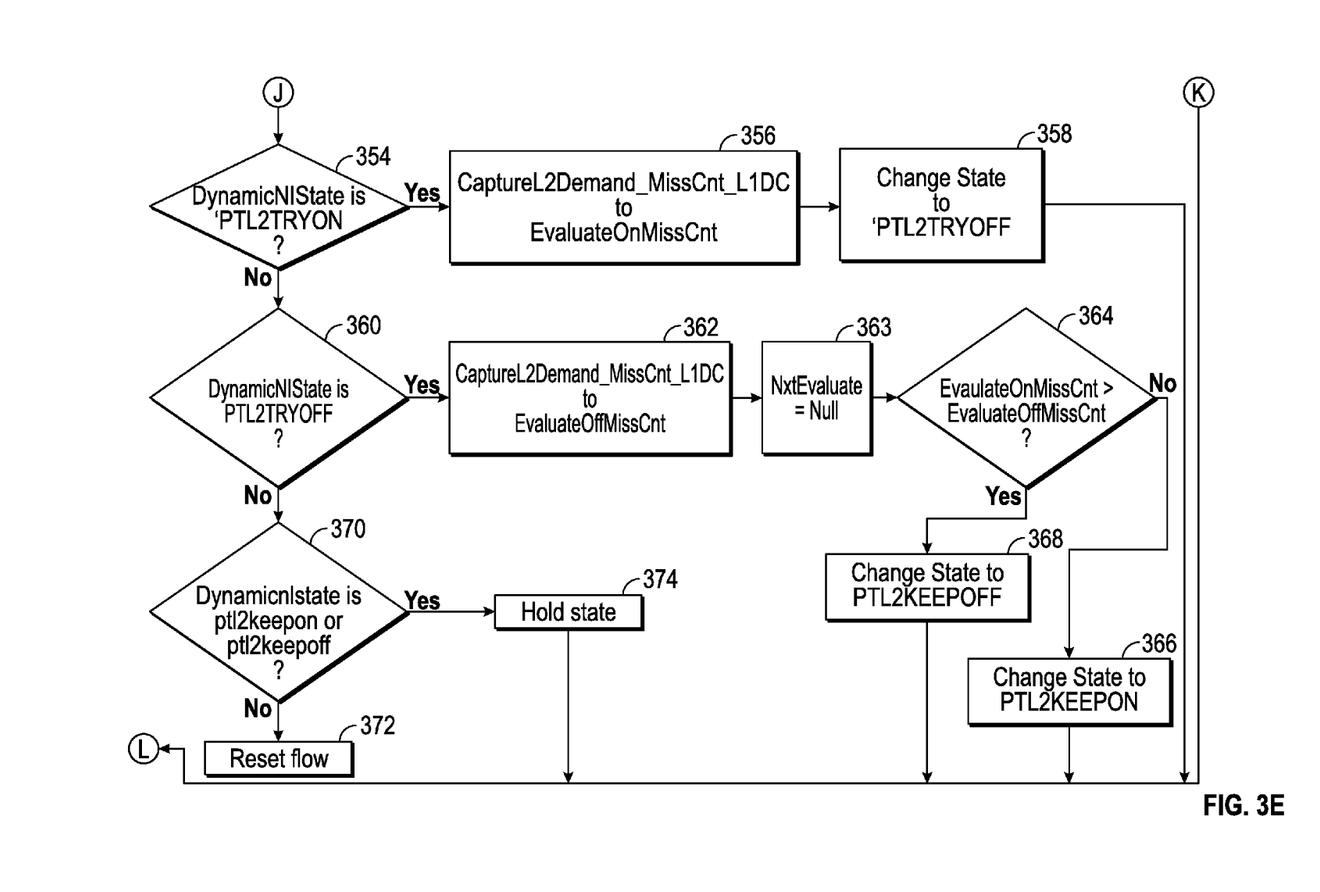

Referring now to FIG. 2, a flow diagram illustrates a method 200 of prefetching data for a processor according to some embodiments. The prefetch controller 119 operates using the default control logic 121 in step 201. At step 202 the prefetch controller 119 takes a sample of the status of the processor 110. For example, the status may indicate whether the prefetch controller 119 of the processor 110 is currently evaluating a feature, or is to select a feature to evaluate over a period until the next sample, or is to enable a feature until a set number of sample periods have expired. In the example provided, the sample is repeatedly taken each time a set number of clock cycles have passed. For example, step 202 may be taken after a number of clock cycles that corresponds to 10,000 retired micro-op instructions. The number of instructions between samples may vary without departing from the scope of the present disclosure. Additionally, other criteria, such as instruction signatures, may be employed for determining when a sample is to be taken.

At step 204 the prefetch controller 119 determines whether to evaluate a hardware prefetching feature, such as features of the control logic 123 or 124. For example, step 204 may be performed at the beginning of a sample group when the number of samples taken in step 202 exceeds a sample group threshold. When the number of samples does not exceed the sample threshold, the sample count will be increased and the method will then evaluate whether the prefetch controller 119 is currently evaluating a candidate feature in step 212, as will be discussed below. When the prefetch controller is not evaluating a candidate feature, the method returns to step 202 to take another sample. When the number of samples taken in step 202 exceeds the threshold, the prefetch controller 119 determines (in step 204) that a control logic 123 or 124 is to be evaluated and the method proceeds to step 205. At step 205 the prefetch controller 119 disables the control logics 123 and 124 and operates using the default control logic 121.

At step 206 the prefetch controller 119 determines whether an instruction fetch (IF) miss rate is higher than a threshold. In the example provided, the IF miss rate is defined by the number of instruction fetch/prefetch requests that miss in the L2 cache, as recorded over the last three samples. A low IF miss rate indicates an application that may benefit from using the control logic 124 for next line prefetching to supplement the default control logic 121. For example, a desktop graphics processing application typically has a low IF miss rate because the processing is executing instruction loops (that is, repeating previously executed instructions) that are less likely to cause an IF miss. Therefore, when the IF miss rate is less than the threshold, the control logic 124 for next line prefetching is selected as the candidate feature and the method proceeds to step 208.

A high instruction cache miss rate indicates an application that may benefit from using the control logic 123 for training the PT on L2 miss traffic instead of the default control logic 121. For example, server applications have a large instruction footprint and are more likely to have a high IF miss rate. Therefore, when the IF miss rate exceeds the threshold, the control logic 123 for training the PT on L2 miss traffic is selected in step 209 as the candidate feature.

To evaluate the candidate feature, the prefetch controller 119 captures a performance metric to indicate whether the candidate feature improves performance. The prefetch controller captures the performance metric for a sample during which the candidate feature is inactive and for a sample during which the candidate feature is active. The performance metric is preferably specific to the control logic 123, 124 selected as the candidate feature. For example, when control logic 123 for training the PT on L2 miss traffic is the candidate feature, a counter that captures the number of data accesses that missed in the L2 cache may be used as the performance metric. When control logic 124 for next line prefetching is the candidate feature, a counter that captures the number of L2 misses for the L1 data cache and IF fill/fetch demand requests may be used as the performance metric. The L2 miss for L1 data cache and IF fill/fetch demand requests metric may indicate where using the control logic 124 for next line prefetching starts hurting overall performance.

The performance metric is captured during an "evaluate off" or inactive sample during which the candidate feature is inactive in step 210. For example, the performance metric is captured in the first sample of a sample group when the candidate feature is disabled. The candidate feature is then activated by the DPSL 122 in step 211 and the method returns to step 202 where another sample is taken. It should be appreciated that activating the candidate feature may include disabling a portion of the default control logic 121 when the control logic 123 for training the PT 120 on L2 traffic is the candidate feature. When the control logic 124 for next line prefetching is the candidate feature, activating the candidate feature in step 211 involves activating the control logic 124 in parallel with the default control logic 121.

When the prefetch controller 119 determines in step 212 that the DPSL 122 is evaluating the candidate feature, the method proceeds to step 213. The prefetch controller 119 may determine that the DPSL 122 is evaluating the candidate feature when a bit is set to indicate that the prefetch controller 119 determined that steps 210 and 211 were performed in the sample prior to the current sample. The performance metric is then captured for an "evaluate on" or active sample in which the candidate feature is active in step 213. For example, the performance metric is captured in the second sample of a sample group after the candidate feature was enabled in step 211 of the prior sample. As discussed above, when the control logic 123 for training the PT 120 on the L2 miss steam is the candidate feature, the control logic 123 disables at least a portion of the default control logic 121 so that the default control logic 121 is not training the PT 120 with L1 miss stream traffic. When the control logic 124 is the candidate feature, the control logic 124 runs in parallel with the default control logic 121.

At step 214 the performance metric captured in step 213 with the candidate feature active is compared to the performance metric captured in step 210 with the candidate feature inactive. The prefetch controller 119 sets the candidate feature as active for the remainder of the samples in the current sample group in step 217 when the performance metric indicates improved performance with the candidate feature active. When the performance metric indicates improved performance with the candidate feature inactive, the prefetch controller 119 in step 215 sets the candidate feature as inactive and uses the default control logic in step 216. The method then returns to step 202 to take a sample. The prefetch controller 119 will then use default control logic 216 with the control logics 123 and 124 disabled until step 204 indicates that a candidate feature is to be selected and evaluated. Accordingly, the prefetch controller 119 repeatedly selects and evaluates a candidate feature to determine whether the selected feature improves performance of the processor 110.

In some embodiments, the prefetch controller includes control logic that substantially follows the pseudo code shown in Table 1 below. In the pseudo code, Evaluating State is one of {NONE, EVALUATING_PT, EVALUATING_NL}, DynamicNlState is one of {NLTRYON, NLTRYOFF, NLKEEPON, NLKEEPOFF}, DynamicPtState is one of {PTL2TRYON, PTL2TRYOFF, PTL2KEEPON, PTL2KEEPOFF}, Boolean PtUsesL2, and Boolean NlisOn.

TABLE 1

```
Always {
    PtUsesL2 = (DynamicPtState == PTL2TRYON) or
        (DynamicPtState == PTL2KEEPON)
    NlisOn = (DynamicNlState == NLTRYON) or (DynamicNlState ==
    NLKEEPON)}
AtSample( ) {
    sample_count = sample_count + 1
    if (sample_count > config_sample_max) {
        sample_count = 0
        IFL2MissPTI = ((last three samples of IF L2 misses)/3)
        /(config_sample_size
        /1000)
        // Timer, so reset
        Evaluating = NONE
        DynamicNlState = NLKEEPOFF
        DynamicPtState = PTL2KEEPOFF
        if (IFL2MissPTI > config_miss_threshold_pt) {
            // Will experiment with the PT training L1 or L2 miss
            traffic. NL already
    reset to OFF.
            DynamicPtState = PTL2TRYON
            Evaluating = EVALUATING_PT
            PtUsesL1 = False }
        if (IfL2MissPti < config_miss_threshold_nl) {
            // Will experiment with the NL On or Off. PT already
            reset toL1.
            DynamicNlState = NLTRYON
            Evaluating = EVALUATING NL } }
    else {
        if (Evaluating == EVALUATING_PT and
        DynamicPtConfig==True) {
            UpdateDynamicPtState( )
        } else if (Evaluating == EVALUATING_NL and
        DynamicNlConfig==True) {
            UpdateDynamicNlState( ) } } }
UpdateDynamicPtState( ) {
    if (Dynamic PtState PTL2TRYON) {
```

TABLE 1-continued

```
        DynamicPtState = PTL2TRYOFF
        PtUsesL1 = True
        CapturePtL2MissRate = demand miss rate of last sample (just
        LS traffic)
        Return }
    if (DyamicPtState == PTL2TRYOFF) {
        CapturePtL1MissRate = demand miss rate of last sample (just
        LS traffic)
        if (CapturePtL2MissRate > CapturePtL1MissRate -
        (CapturePtL1MissRate >> config_pt shift)) {
            DynamicPtState PTL2KEEPOFF
        } else {
            DynamicPtState PTL2KEEPON } } }
UpdateDynamicNlState( ) {
    if (DynamicNlState NLTRYON) {
        DynamicNlState = NLTRYOFF
        return }
    if (DynamicNlState == NLTRYOFF) {
        CaptureNlOffMissRate = demand miss rate of the last
        sample (from both IF and LS traffic)
        if (CaptureNlOnMissRate > CaptureNlOffMissRate -
        (CaptureNlOffMissRate >> config_nl_shift)) {
            DynamicNlState NLKEEPOFF
        } else {
            DynamicNlState NLKEEPON }
        DynamicNlState = NLKEEPON
        return } }
```

Referring now to FIGS. 3A to 3E, a flow diagram illustrates a method 300 of prefetching data for a processor according to some embodiments. A sample size count is set equal to a sample size threshold and a sample group threshold is set equal to a config sample max count in step 301. At step 302 it is determined whether a sample size count is expired. When the sample size count is greater than a threshold, the method proceeds to step 304 where a state is held and then returns to step 302 after decrementing the sample size counter in step 305. When the sample size count is expired, the method proceeds to step 306 to set the sample size count equal to the sample size threshold. Step 307 decrements the sample group counter and step 308 determines whether a sample group count is less than three. When the sample group count is less than three, the method proceeds to perform the pseudo code shown in step 310 to enable a TotalIFL2MissCounter to count instruction fetches that miss in L2 for the last three samples. Step 312 determines whether the sample group count has expired. When the sample size count and sample group count are not expired the method advances to step 314. When the sample size count and sample group count are expired the method performs the pseudo code shown in steps 316 and 318 to compute the IF in L2 misses, reset the sample group counter, reset the TotalIFL2Miss counter, and update the evaluations state before returning to step 302.

At step 314 it is determined whether the evaluating state is "NONE." When the evaluating state is "NONE" the method proceeds to step 304 to hold the state and return to step 302. When the evaluating state is other than "NONE," the method proceeds to step 320. Step 320 determines whether the evaluating state is set to evaluate the next line prefetcher. When the evaluating state is set to evaluate the next line prefetcher the method proceeds to determine whether the condition of step 322 is satisfied. When the condition of step 322 is satisfied the method performs the pseudo code in 324 and 326 to capture a data and instruction L2 cache miss count when the next line features was on over the previous sample and turning off the next line feature before returning to step 302. When the condition of step 322 is not satisfied the method determines whether the condition of step 328 is satisfied. When the condition of step 328 is satisfied the method performs the pseudo code of step 330 to capture the data and instruction L2 cache miss count when the next line feature was off over the previous sample. The method proceeds to step 331 and determines whether the condition in step 332 is satisfied. When the condition of step 332 is not satisfied, the method performs the pseudo code of step 334 to enable the next line feature and returns to step 302. When the condition of step 332 is satisfied, the method performs the pseudo code of step 336 to disable the next line feature and returns to step 302.

When the condition of step 328 is not satisfied, the method determines whether the condition of step 338 is satisfied. When the condition of step 338 is satisfied the method holds the state in step 340 and returns to step 302. When the condition of step 338 is not satisfied the method determines that an error has occurred in step 342.

When the condition of step 320 is not satisfied, the method determines whether the evaluating state is set to evaluate training the prefetch table on L2 misses in step 350. When the condition of step 350 is not satisfied the method specifies a reset flow in step 352. When the condition of step 350 is satisfied, the method proceeds to determine whether the condition of step 354 is satisfied. When the condition of step 354 is satisfied, the method proceeds to perform the pseudo code of steps 356 and 358 to capture the instruction access L2 cache miss count the PT on L2 feature was on over the last sample and turning off the PT on L2 feature before returning to step 302. When the condition of step 354 is not satisfied the method proceeds to determine whether the condition of step 360 is satisfied. When the condition of step 360 is satisfied, the method performs the pseudo code of step 362 to capture the instruction access L2 cache miss count when the PT on L2 feature was turned off over the last sample. The method proceeds to step 363 and determines whether the condition of step 364 is satisfied. When the condition of step 364 is not satisfied the method performs the pseudo code of step 366 to enable the PT on L2 feature and returns to step 302. When the condition of step 364 is satisfied the method performs the pseudo code of step 368 to disable the PT on L2 feature and returns to step 302. When the condition of step 360 is not satisfied the method determines whether the condition of step 370 is satisfied. When the condition of step 370 is not satisfied the method determines that an error has occurred in step 372. When the condition of step 370 is satisfied the pseudo code of step 374 is performed to maintain the current state before returning to step 302.

A data structure representative of the computer system 100 and/or portions thereof included on a computer readable storage medium may be a database or other data structure which can be read by a program and used, directly or indirectly, to fabricate the hardware comprising the computer system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computer system 100. The netlist may then be placed and routed to produce a data set describing geometric shapes to be applied to masks. The masks may then be used in various semiconductor fabrication steps to produce a semiconductor circuit or circuits corresponding to the computer system 100. Alternatively, the database on the computer readable storage medium may be the netlist (with or without the synthesis library) or the data set, as desired, or Graphic Data System (GDS) II data.

The method illustrated in FIG. 3 may be governed by instructions that are stored in a non-transitory computer readable storage medium and that are executed by at least one processor of the computer system 100. Each of the operations shown in FIG. 3 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The system and method provide numerous advantages over prior systems and methods. For example, the system and method provide quicker response time and fewer stalls in the processor. Furthermore, selectively enabling next line L2 cache prefetches often reduces average memory service time by allowing more demand requests to hit in the L2 cache. Additionally, selectively training the PT with L2 traffic often improves power efficiency because the PT is not trained with polluting L1 miss traffic and thus is not issuing as many potentially inaccurate L2 Prefetch requests to the system.

Embodiments have been described herein in an illustrative manner, and it is to be understood that the terminology which has been used is intended to be in the nature of words of description rather than of limitation. Obviously, many modifications and variations are possible in light of the above teachings. Various implementations may be practiced otherwise than as specifically described herein, but are within the scope of the appended claims.

What is claimed is:

1. A method of prefetching data for a processor, the method comprising:
   selecting one of a first prefetching control logic and a second prefetching control logic of the processor as a candidate feature for evaluation, wherein selecting the candidate feature includes selecting the candidate feature based on an instruction fetch miss rate;
   capturing a performance metric of the processor over an inactive sample period when the candidate feature is inactive;
   capturing the performance metric of the processor over an active sample period when the candidate feature is active;
   comparing the performance metric of the processor for the active and inactive sample periods; and
   setting a status, by the processor, of the candidate feature as enabled when the performance metric in the active sample period indicates improvement over the performance metric in the inactive sample period, and setting the status, by the processor, of the candidate feature as disabled when the performance metric in the inactive sample period indicates improvement over the performance metric in the active sample period.

2. The method of claim 1 wherein selecting the candidate feature further includes selecting one of the first prefetching control logic and the second prefetching control logic at a first sample of each of a plurality of sample groups, and wherein the sample groups are taken when a number of clock cycles exceeds a threshold.

3. The method of claim 1 further including training a prefetch table on L1 cache misses.

4. The method of claim 3 further including training the prefetch table on L2 cache misses instead of L1 cache misses when the first control logic is the candidate feature and the candidate feature is active.

5. The method of claim 1 further including prefetching with a next line data prefetcher when the second prefetching control logic is the candidate feature and the candidate feature is active.

6. The method of claim 1 wherein capturing the performance metric further includes capturing a number of demand fills that miss in the L2 cache when the first prefetching control logic is the candidate feature.

7. The method of claim 1 wherein capturing the performance metric further includes capturing a number of L2 cache misses for an L1 data cache and IF fill/fetch demand requests when the second prefetching control logic is the candidate feature.

8. An electronic device comprising:
a processor execution core;
an interconnect in electronic communication with the processor execution core;
a first cache memory coupled to the interconnect;
a second cache memory coupled to the interconnect; and
a hardware implemented prefetch controller coupled to the interconnect and configured to evaluate a first prefetching control logic and a second prefetching control logic for prefetching data from a system memory to at least one of the first and second cache memories, the prefetch controller comprising:
the first prefetching control logic;
the second prefetching control logic;
a default control logic to prefetch data with the first and second prefetching control logics inactive; and
a dynamic prefetcher selection logic to select one of the first prefetching control logic and the second prefetching control logic as a candidate feature, wherein selecting the candidate feature includes selecting the candidate feature based on an instruction fetch miss rate, capture a performance metric of the computing system over an inactive sample period when the candidate feature is inactive, capture the performance metric of the computing system over an active sample period when the candidate feature is active, compare the performance metric for the active and inactive sample periods, and set a status of the candidate feature as active when the performance metric in the active sample period indicates improvement over the performance metric in the inactive sample period, and set the status of the candidate feature as inactive when the performance metric in the inactive sample period indicates improvement over the performance metric in the active sample period.

9. The electronic device of claim 8 wherein the dynamic prefetcher selection logic is further configured to select the candidate feature at a first sample of each of a plurality of sample groups.

10. The electronic device of claim 8 wherein the prefetch controller further includes a prefetch table, and wherein the default control logic is configured to train the prefetch table on first cache memory misses.

11. The electronic device of claim 10 wherein the first prefetching control logic is configured to disable at least a portion of the default control logic and train the prefetch table on misses for the second cache memory.

12. The electronic device of claim 8 wherein the second prefetching control logic is a next line data prefetcher.

13. The electronic device of claim 8 wherein the performance metric is a number of demand fills that miss in the second cache memory when the first prefetching control logic is the candidate feature.

14. The electronic device of claim 8 wherein the performance metric is a number of second cache memory misses from instruction fetch and data fetch requests when the second prefetching control logic is the candidate feature.

15. The electronic device of claim 8 further including the system memory and a second interconnect coupled to the system memory and the interconnect, wherein processor execution core, the first and second cache memories, and the prefetch controller are included in a processor and the processor is in electronic communication with the system memory via the interconnect.

16. A computing system comprising:
a system memory;
an interconnect coupled to the system memory; and
a processor in electronic communication with the system memory via the interconnect,
the processor comprising:
a first cache memory coupled to the interconnect;
a second cache memory coupled to the interconnect;
a prefetch table control logic coupled to the interconnect configured to prefetch data for the second cache memory and to train on miss traffic from the first cache memory;
a first prefetch control logic configured to train the prefetch table control logic on miss traffic from the second cache memory;
a second prefetch control logic configured to enable next line data prefetching to prefetch data for the at least one of the first and second cache memories; and
a dynamic prefetcher selection logic configured to select one of the first prefetch control logic and the second prefetch control logic as a candidate feature, wherein selecting the candidate feature includes selecting the candidate feature based on an instruction fetch miss rate, capture a performance metric of the processor over an active sample period when the selected candidate feature is active, capture the performance metric of the processor over an inactive sample period when the selected candidate feature is inactive, compare the performance metric of the processor for the active and inactive sample periods, and set a status of the selected candidate feature as active when the performance metric in the active sample period indicates improvement over the performance metric in the inactive sample period, and set the status of the selected candidate feature as inactive when the performance metric in the inactive sample period indicates improvement over the performance metric in the active sample period.

17. The computing system of claim 16 wherein the dynamic prefetcher selection logic is further configured to select the candidate feature at a first sample of each of a plurality of sample groups.

18. The computing system of claim 16 wherein the performance metric is a number of demand fills that miss in the second cache memory when the first prefetching control logic is the candidate feature and the performance metric is a number of second cache memory misses for the first cache memory and instruction fetch fill/fetch demand requests when the second prefetching control logic is the candidate feature.

* * * * *